United States Patent
Schacknies et al.

(10) Patent No.: US 8,801,335 B2
(45) Date of Patent: Aug. 12, 2014

(54) WIND POWER PLANT FOUNDATION AND WIND POWER PLANT

(75) Inventors: Meik Schacknies, Aurich (DE); Markus Schade, Hurth (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 13/641,862

(22) PCT Filed: Apr. 21, 2011

(86) PCT No.: PCT/EP2011/056408
§ 371 (c)(1),
(2), (4) Date: Jan. 25, 2013

(87) PCT Pub. No.: WO2011/131751
PCT Pub. Date: Oct. 27, 2011

(65) Prior Publication Data
US 2013/0129474 A1    May 23, 2013

(30) Foreign Application Priority Data

Apr. 21, 2010 (DE) .......................... 10 2010 028 038

(51) Int. Cl.
*E02D 7/00* (2006.01)
*E02D 11/00* (2006.01)
*E02D 13/00* (2006.01)

(52) U.S. Cl.
USPC ........... 405/232; 405/229; 405/256; 405/233; 52/294; 52/292; 52/299; 52/295

(58) Field of Classification Search
USPC .............. 52/294, 298, 299, 223.13, 296, 295, 52/649.2, 160, 292; 405/229, 256, 244, 405/232, 233; 249/34
See application file for complete search history.

(56) References Cited

U.S. PATENT DOCUMENTS

| | | | | |
|---|---|---|---|---|
| 4,218,858 A | * | 8/1980 | Legler | 52/165 |
| 4,228,627 A | * | 10/1980 | O'Neill | 52/295 |
| 5,588,272 A | * | 12/1996 | Haponski | 52/309.12 |
| 5,966,882 A | * | 10/1999 | Naito | 52/295 |
| 6,047,505 A | * | 4/2000 | Willow | 52/98 |
| 7,070,362 B2 | * | 7/2006 | Rasmussen | 405/232 |
| 7,360,315 B2 | * | 4/2008 | Knepp et al. | 33/370 |
| 7,735,273 B2 | * | 6/2010 | Knepp et al. | 52/294 |
| 8,161,698 B2 | * | 4/2012 | Migliore | 52/295 |

* cited by examiner

FOREIGN PATENT DOCUMENTS

| | | |
|---|---|---|
| DE | 102 26 996 A1 | 4/2003 |
| DE | 10 2008 010 660 B3 | 9/2009 |
| WO | 03/031733 A1 | 4/2003 |
| WO | 2009/103475 A2 | 8/2009 |

OTHER PUBLICATIONS

International Search Report, received May 23, 2012, for PCT/EP2011/056408, 10 pages.

*Primary Examiner* — Chi Q Nguyen
(74) *Attorney, Agent, or Firm* — Seed IP Law Group PLLC

(57) ABSTRACT

There is provided a wind power installation foundation having a reinforcement comprising a plurality of steel bars and radial steel bars and a lower pylon segment having a plurality of holes in the wall of the pylon segment for receiving the bars or radial bars. In addition there is provided a concrete body which covers the reinforcement and the lower portion of the pylon segment. The foundation has a plurality of holders for holding the bars or radial bars of the reinforcement. The holder has an upper bracket for fixing to the pylon segment and a lower foot for receiving the bars or radial bars of the reinforcement. The length of the holder is adapted to be variable.

17 Claims, 3 Drawing Sheets

WIND POWER PLANT FOUNDATION AND WIND POWER PLANT

BACKGROUND

1. Technical Field

The present invention concerns a wind power installation foundation and a wind power installation.

2. Description of the Related Art

A foundation of a wind power installation substantially comprises concrete and a steel reinforcement. Typically a lower (steel) pylon segment is placed and reinforcement comprising steel bars is provided in the radial and tangential directions. In that case the upper radial bars can be passed through holes in the lower pylon segment for receiving transverse tensile tie means. The foundation can then be filled up with concrete. Besides the radial bars the reinforcement can also have peripherally extending bars or vertical bars.

In operation of a wind power installation both tensile and also compressive forces can act on the lower pylon segment, the reinforcement and the concrete. Particularly in the case of tensile forces (caused for example by pylon expansion), that situation can result in the load being inappropriately applied and in damage to the concrete in the region of the holes in the pylon segment.

To obviate that problem in accordance with the state of the art a rubber tube is used as a sheathing for the reinforcement within the pylon wall.

As general state of the art attention is directed to DE 10 2008 010 660 B3 and DE 102 26 996 A1.

BRIEF SUMMARY

Thus an object of the present invention is to provide a wind power installation foundation which reduces damage to the foundation by tensile forces.

That object is attained by a wind power installation foundation according to claim 1 and by a wind power installation according to claim 5.

Thus the wind power installation foundation according to the invention has a reinforcement comprising a plurality of radial steel bars and a lower pylon segment having a plurality of holes in the wall of the pylon segment for receiving bars or radial bars or for passing radial bars therethrough. In addition there is provided a concrete body which covers the reinforcement and a lower portion of the pylon segment. The foundation has a plurality of holders for holding bars or radial bars of the reinforcement. The holder has an upper bracket for fixing to the pylon segment and a lower foot for receiving bars or radial bars of the reinforcement. The length of the bracket is adapted to be variable.

Thus the holder can be adjusted in such a way that the foot receives a bar of the reinforcement, on which are provided radial bars which extend through the holes in the wall of the pylon segment. In that arrangement the holders can be so adjusted that the radial bars extending through the holes in the wall of the pylon segment do not touch the wall of the pylon segment.

The reinforcement can also have steel bars in a tangential direction or steel bars of an annular configuration.

In an aspect of the present invention the holder can be fixed to a flange at the upper end of the pylon segment. The upper bracket has a slot. The foot is fixed to the second end of the bracket.

In a further aspect of the invention the foot has slots which permit adjustment of the length of the holder.

In a further aspect of the invention the holes in the walls of the pylon segment are oval or in the form of a slot.

The invention also concerns a wind power installation comprising a pylon and a foundation for the pylon, wherein the foundation can correspond to the above-described wind power installation foundation.

The invention also concerns a method of setting up a wind power installation and in particular a foundation of a wind power installation. In the method there are provided a lower pylon segment and a reinforcement comprising radial steel bars and steel bars in a tangential direction, wherein some of the radial bars extend through holes in the wall of the pylon segment. There are also provided holders comprising an upper bracket at the one end of the pylon segment. The holder has a lower foot which serves to receive a steel bar or radial bar. The length of the holder is adjusted such that the radial bars can extend through the holes in the wall of the pylon segment without in that case touching the wall of the pylon segment.

Further configurations of the invention are subject-matter of the appendant claims.

Advantages and embodiments by way of example of the invention are described in greater detail hereinafter with reference to the drawing.

DETAILED DESCRIPTION

Figure 1:
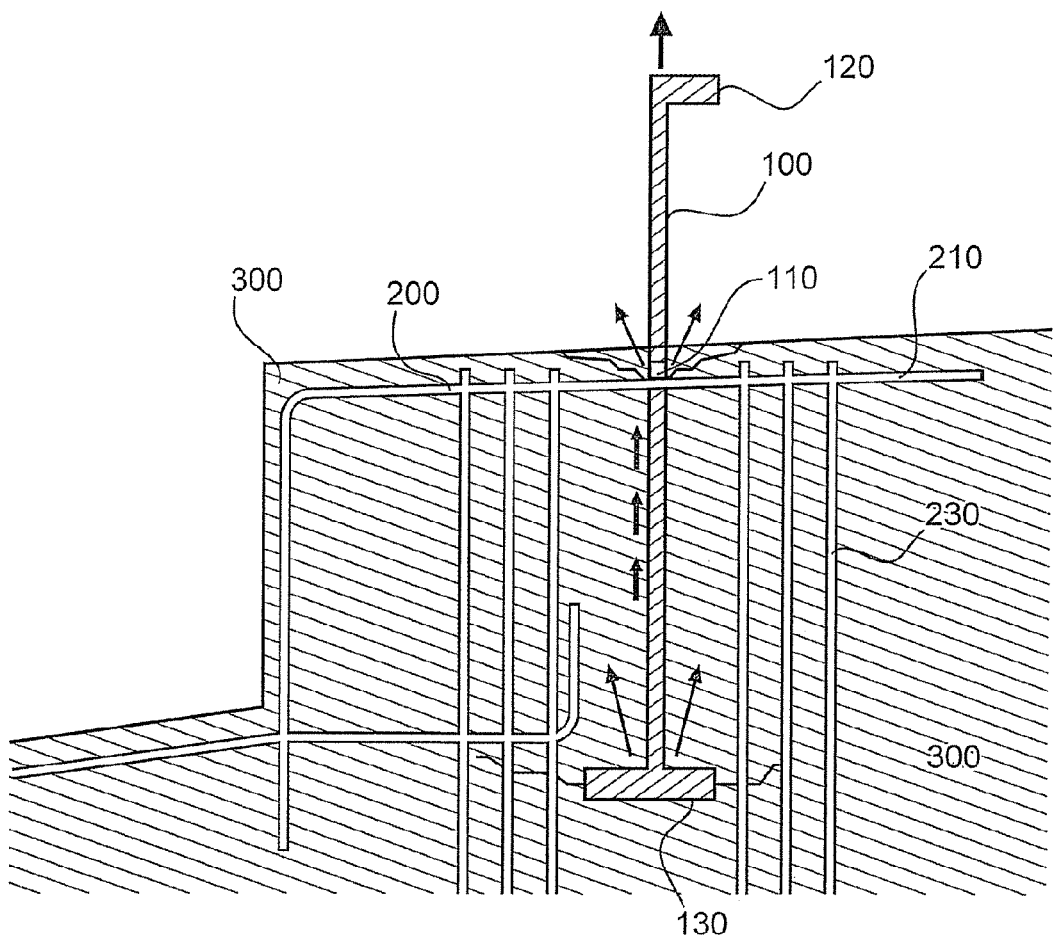
FIG. 1 shows a diagrammatic view of a foundation of a wind power installation according to invention.

FIG. 1 shows a diagrammatic view of a foundation of a wind power installation according to the invention. A lower pylon segment 100 is set in place and then there is provided a reinforcement comprising steel rods or bars and radial rods or bars 200. Then the foundation is filled with concrete 300. The lower pylon segment 100 has holes (for example oval holes) 110, through which radial bars of the reinforcement can be passed. That can be effected to improve the statics of the foundation. Besides the radial bars 200 there can also be peripherally extending bars or vertical bars for the reinforcement. The lower pylon segment is preferably made from steel and has an upper flange 120 and a lower flange 130, wherein the upper flange projects out of the foundation and the lower flange 130 is concreted in place.

Figure 2:
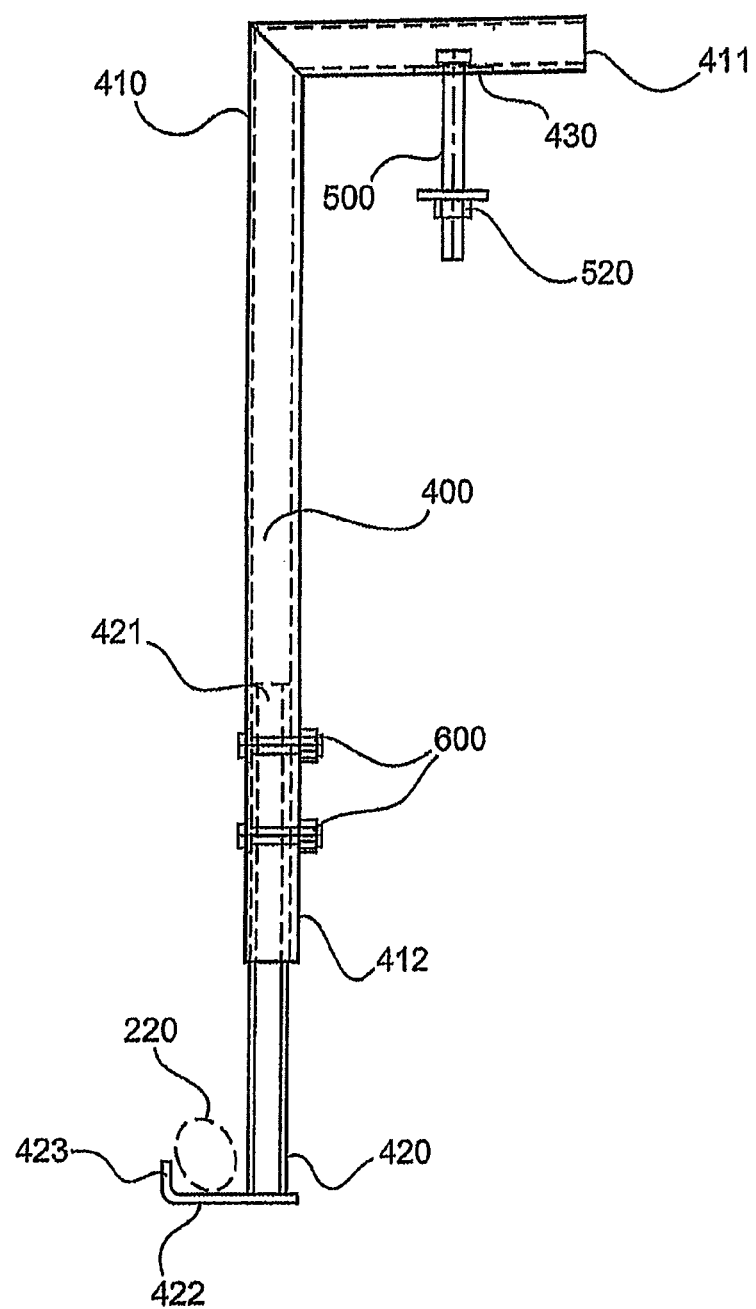
FIG. 2 shows a diagrammatic view of a holder according to a first embodiment of the invention.

FIG. 2 shows a diagrammatic view of a holder according to a first embodiment of the invention. The holder 400 has an upper bracket 410 and a lower foot 420 which are connected together. Preferably the upper bracket 410 and the lower foot 420 are designed to be displaceable relative to each other so that the length of the holder 400 is variable.

The upper bracket 410 has a first and a second end 411, 412, wherein the first end 411 of the bracket 410 is adapted for fixing to for example an upper flange 120 of the pylon segment 100. The lower foot 420 can be fixed to the second end 412 of the bracket 410. The first end 411 of the bracket 410 can be of an angled configuration and can have at least one slot 430 so that the angled end 411 can be fixed to the flange 120 of the pylon segment 100 for example by means of screws and nuts. The lower foot 420 has a first and second end 421, 422, wherein the first end 421 of the foot 420 can be fixed to the second end 412 of the upper bracket 410. In this case slots can be provided either at the first end 421 of the foot 420 or at the second end 412 of the bracket 410 so that the bracket 410 and the foot 420 can be fixed together and the length of the holder is variable. The second end 422 of the foot 420 is of angled configuration and can optionally have an upwardly bent end. In this arrangement the second end 422 of the lower foot 420 serves to receive steel bars or radial bars of the reinforcement. In that respect in particular an inner ring comprising at least one steel bar can be received around the pylon segment. The radial bars of the reinforcement can be provided on or at the inner ring. Those radial bars extend through the holes 110 in the wall of the lower pylon segment 100. In that case the length of the holder 400 is preferably so adjusted that the radial bars are not in contact with the wall of the lower pylon segment.

Figure 3:
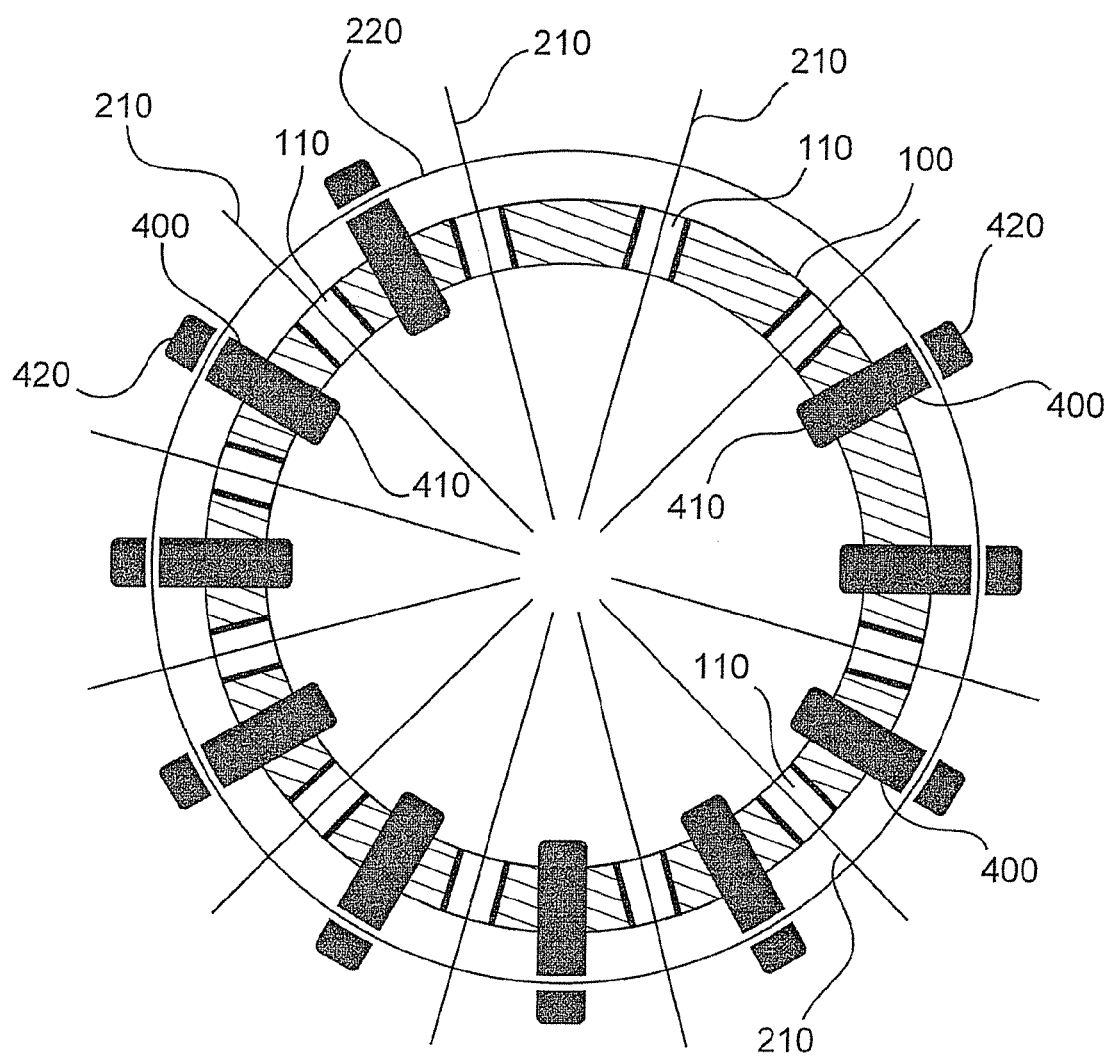
FIG. 3 shows a diagrammatic view of a foundation of a wind power installation according to a second embodiment.

FIG. 3 shows a diagrammatic view of a foundation of a wind power installation according to a second embodiment. This Figure shows in particular the lower pylon segment 100 with the holes 110. Radial bars 210 of the reinforcement are provided through the holes 110. Provided around the pylon segment is at least one ring 220 comprising a steel bar. That ring 220 can be provided beneath the plurality of radial bars 110. In addition a plurality of holders 400 (for example holders according to the first embodiment) is fixed with the first end on the pylon segment. The second ends of the holders serve to receive the ring 220. Preferably the length of the holders is so adjusted that the radial bars 210 on the ring 220 extend through the holes 110 without in that case touching the wall of the pylon segment.

When the concrete is cast into the foundation the concrete can be filled up until the reinforcement is covered. Therefore the lower foot of the holder is also concreted in place. The upper brackets of the holder can however be further used. For that purpose it is only necessary for the lower foot to be removed (for example ground off). The upper brackets can thus be re-used.

The above-described lower pylon segment is preferably a steel pylon segment.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation foundation comprising:
   a reinforcement having a plurality of steel bars and radial steel bars;
   a pylon segment having a plurality of holes, the plurality of radial bars of the reinforcement located in a respective hole;
   a concrete body that covers the reinforcement and a lower portion of the pylon segment; and
   a plurality of holders, each of the holders having an upper portion that includes an upper bracket configured to be fixed to the upper portion of the pylon segment above the concrete body and a lower portion that includes a lower foot located in the concrete body and configured to receive at least one of the bars and radial bars of the reinforcement, the upper portion of the holder being adjustable relative to the lower portion of the holder.

2. The wind power installation foundation according to claim 1 wherein the upper bracket of the holder is configured to be fixed to an upper flange of the pylon segment, wherein the upper bracket has a slot at a first end and is fixed at a second end to the lower foot.

3. The wind power installation foundation according to claim 1 wherein the lower foot has at least one of holes and slots for adjustment of the length of the holder.

4. The wind power installation foundation according to claim 1 wherein the holes in the wall of the pylon segment are one of circular, oval, and a slot.

5. The wind power installation foundation according to claim 1 wherein the plurality of steel bars are annular configuration.

6. The wind power installation foundation according to claim 1 wherein the second end of the upper bracket has holes for adjustment of the length of the holder.

7. The wind power installation foundation according to claim 1 wherein the lower foot is rotatably coupled to the second end of the upper bracket.

8. The wind power installation foundation according to claim 1 wherein a second end of the lower foot has an upwardly bend end.

9. The wind power installation foundation according to claim 1 wherein the second end of the lower foot has an angled configuration.

10. The wind power installation foundation according to claim 1 wherein the upper portion of the holder is adjustable by telescoping with the lower portion of the holder.

11. A wind power installation comprising:
    a foundation having:
       a reinforcement including a plurality of steel bars and radial steel bars;
       a pylon segment having a lower portion that includes a plurality of holes and an upper portion, the plurality of radial bars of the reinforcement located in a respective hole;
       a concrete body that covers the reinforcement and the lower portion of the pylon segment;
       a plurality of holders, each of the holders having an upper portion that includes an upper bracket configured to be fixed to the upper portion of the pylon segment above the concrete body and a lower portion that includes a lower foot located in the concrete body and configured to receive at least one of the bars and radial bars of the reinforcement, wherein the upper and lower portions of the holder are variable relative to each other; and
    a pylon on the foundation.

12. The wind power installation according to claim 11 wherein the lower foot has at least one of holes and slots for adjustment of the length of the holder.

13. The wind power installation foundation according to claim 11 wherein the upper and lower portions of the holder are adjustable by telescoping.

14. A method of setting up a wind power installation foundation comprising:
   providing a pylon segment;
   providing a reinforcement having a plurality of steel bars and radial steel bars, wherein the radial bars extend through holes in a wall of the pylon segment;
   providing a plurality of holders having an upper portion that includes an upper bracket for fixing to an end of the pylon segment located above the foundation and a lower portion that includes a lower foot for receiving at least one of the bars and radial bars of the reinforcement located in the foundation; and
   adjusting the upper portion and lower portion relative to each other so that the radial bars extend through the holes in the wall of the pylon segment without touching the wall of the pylon segment.

15. The method according to claim 14 wherein adjusting the length of the holder comprises moving the upper bracket relative to the lower foot.

16. The method according to claim 15 further comprising fixing the upper bracket relative to the lower foot.

17. The method according to claim 14 wherein the upper and lower portions of the holder are adjustable by telescoping.

* * * * *